(12) United States Patent
D'Agosto, III

(10) Patent No.: US 6,697,827 B1
(45) Date of Patent: Feb. 24, 2004

(54) PALM TOP COMPUTER IN WHICH ROCKER SWITCH CONTROLS DICTATION FUNCTIONS

(75) Inventor: Nicholas A. D'Agosto, III, Trumbull, CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

(21) Appl. No.: 09/467,715

(22) Filed: Dec. 21, 1999

(51) Int. Cl.$^7$ ................................................. G06F 1/00
(52) U.S. Cl. ........................................................ 708/131
(58) Field of Search ................................. 708/131, 141, 708/105, 108

(56) References Cited

U.S. PATENT DOCUMENTS

| | | | |
|---|---|---|---|
| 5,542,103 A | 7/1996 | Mottier et al. | 455/89 |
| 5,548,832 A | 8/1996 | Karam | 455/226.4 |
| 5,583,382 A | 12/1996 | Wagner | 307/10.1 |
| 5,689,802 A | 11/1997 | Luzzatto | 455/11.1 |
| 6,097,371 A * | 8/2000 | Siddiqui et al. | 345/164 |
| 6,184,862 B1 * | 2/2001 | Leiper | 345/161 |
| 6,321,129 B1 * | 11/2001 | D'Agosto, III | 345/161 |

* cited by examiner

Primary Examiner—Tan V. Mai
(74) Attorney, Agent, or Firm—Anthony L. Meola; Howrey Simon Arnold & White, LLP

(57) ABSTRACT

A palm top computing device includes a rocker switch used to navigate among files stored in the computing device and/or among functions that may be selectable by a user. One function selectable by the user is a dictation mode of operation of the computing device. In the dictation mode, three positions of the rocker switch—"in", "up" and "down"—are respectively employed to actuate basic dictation functions such as record, rewind and play.

10 Claims, 5 Drawing Sheets

PALM TOP COMPUTER IN WHICH ROCKER SWITCH CONTROLS DICTATION FUNCTIONS

FIELD OF THE INVENTION

This invention relates to so-called "palm top" computers, and more particularly to such computers having sound recording capabilities.

BACKGROUND OF THE INVENTION

Computers which fit in the palm of the user's hand are an increasingly popular segment of the consumer electronics industry. Devices of this type now frequently offer a sophisticated user interface, including a sizable display screen and a rocker switch that may be used to scroll up or down among items displayed on the screen, and to select one of the items.

Among other capabilities, some palm top computers permit recording of sounds, as in the case of oral notes spoken by the user into a microphone incorporated in the palm top computer. Audio processing circuitry in the device allows the notes spoken by the user to be recorded in digital form in a solid state memory that is part of the device. A speaker is also provided to audibly reproduce the recorded notes. The oral note taking activity is controlled, typically, by a single push button that functions as a record switch.

This user interface for voice recording falls far short of the level of convenience expected by users of high-quality dedicated dictation devices. The present inventor has now recognized that certain conventional palm top computer devices with sound recording capabilities can be reprogrammed to provide a highly convenient and effective dictation interface without changing the hardware components of the palm top computer.

OBJECTS AND SUMMARY OF THE INVENTION

It is accordingly an object of the invention to provide a palm top computer which includes a highly convenient interface for controlling dictation functions.

It is a further object of the invention to provide such a computer at low cost.

An aspect of the invention provides a palm top computing device which includes a processor, a display device driven by the processor, a memory device connected to the processor, a microphone for generating electrical signals representative of audible sounds received at the microphone, circuitry for storing in the memory device digitized sound signals representative of the electrical signals generated by the microphone, components for audibly reproducing sound signals stored in the memory device, and a rocker switch for being manually operated by a user of the computer device to input instruction signals to the processor, the rocker switch being selectively positionable in an "in" position, an "up" position and a "down" position. According to this aspect of the invention, the computing device is operable in a first mode in which the "up" and "down" positions of the rocker switch are employed by the user to scroll through entries displayed on the display device, and the "in" position of the rocker switch is employed by the user to select an entry displayed on the display device. The computing device is operable in a second mode in which the "in" position of the rocker switch actuates sound recording by the computing device, the "up" position of the rocker switch actuates a rewind function with respect to sound signals stored in the memory device, and the "down" position of the rocker switch actuates a play function with respect to sound signals stored in the memory device.

Another aspect of the invention provides a method of operating a palm top computing device, where the computing device includes a rocker switch for navigating among files stored in the computing device and the method includes the step of using the rocker switch to control dictation functions in a sound recording mode of the computing device.

The present invention provides a highly convenient and efficient user interface for dictation in a palm top computer by adding a new set of functions to the rocker switch commonly provided in palm top computing devices as a navigational tool. The highly advantageous dictation user interface provided in accordance with the invention does not require increased hardware cost.

The foregoing, and other objects, features and advantages of the invention will be further understood from the following detailed description of preferred embodiments and from the drawings, wherein like reference numerals identify like components and parts throughout.

DESCRIPTION OF PREFERRED EMBODIMENTS

Figure 1:
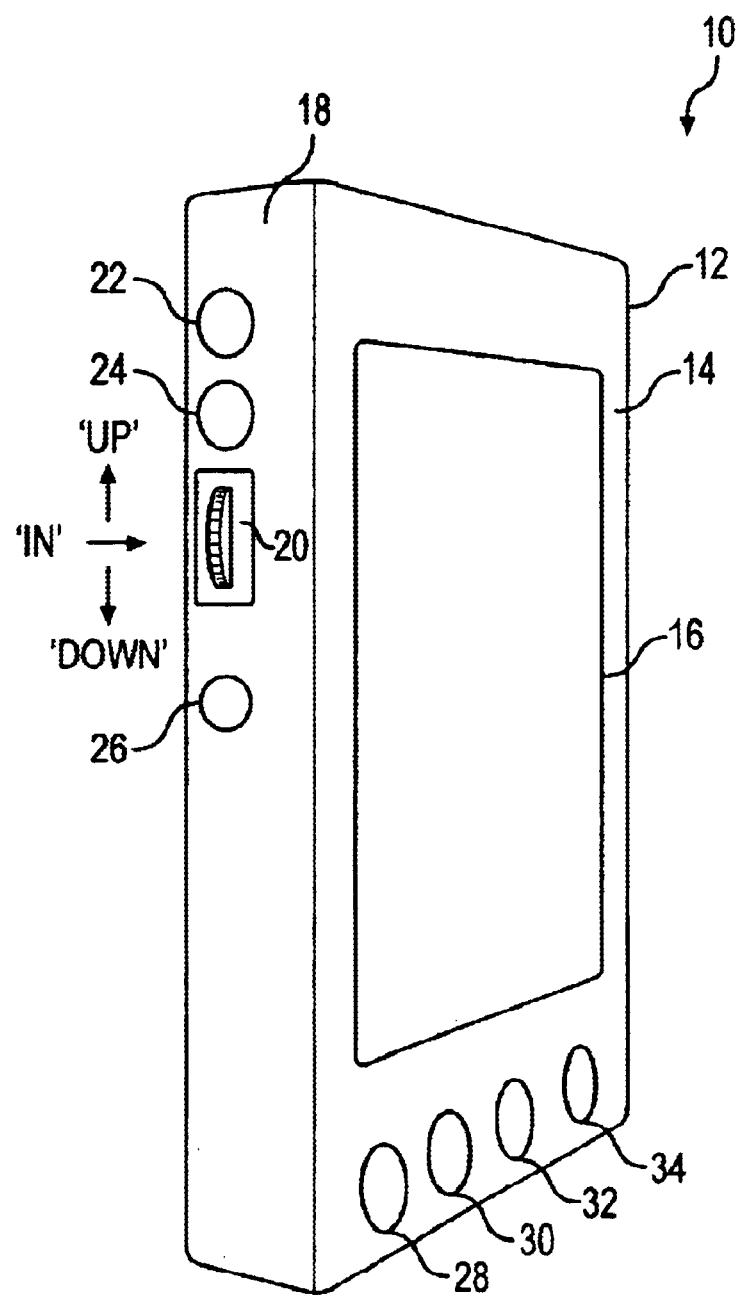
FIG. 1 is a simplified perspective view of a palm top computer in which the present invention is applied.

Preferred embodiments of the invention will now be described with reference to the drawings.

It is preferred, but not required, that the present invention be embodied by suitably programming a palm top computing device which is identical in terms of hardware to any one of a number of existing devices. One such existing device is portrayed in simplified form in FIG. 1. Reference numeral 10 generally indicates the palm top computing device. The computing device 10 includes a housing 12 which contains internal components of the computing device. As will be inferred from previous discussion, the housing 12 is of a shape and size to be held comfortably in the palm of the user's hand.

Mounted on a front face 14 of the housing 12 is a display screen 16. Mounted on a left side face 18 of the housing 12 is a conventional rocker switch 20. (Switches of this type are also called "wheel switches".) Adjacent to rocker switch 20, and somewhat schematically represented, are a microphone 22 and a speaker 24. Indicated at 26, 28, 30, 32 and 34 are various push buttons provided to permit a user of the computing device to access certain functions. These functions may, in general, correspond to known functions of palm top computing devices. However, it is also contemplated to use one or more of the buttons to access functions related to a dictation mode of operation of the computing device 10, as will be discussed below.

As will be understood by those who are familiar with palm top computing devices, the rocker switch 20 may be used in a conventional manner to navigate among files stored in the computing device 10, by controlling a cursor (not shown) displayed on the display screen 16. The rocker switch 20 is actuatable among three positions—an "up" position which enables the user to scroll up through file entries displayed on the display screen 16, a "down" position which enables the user to scroll down among displayed entries, and a "in" position which enables the user to select and/or open a displayed entry.

Figure 2:
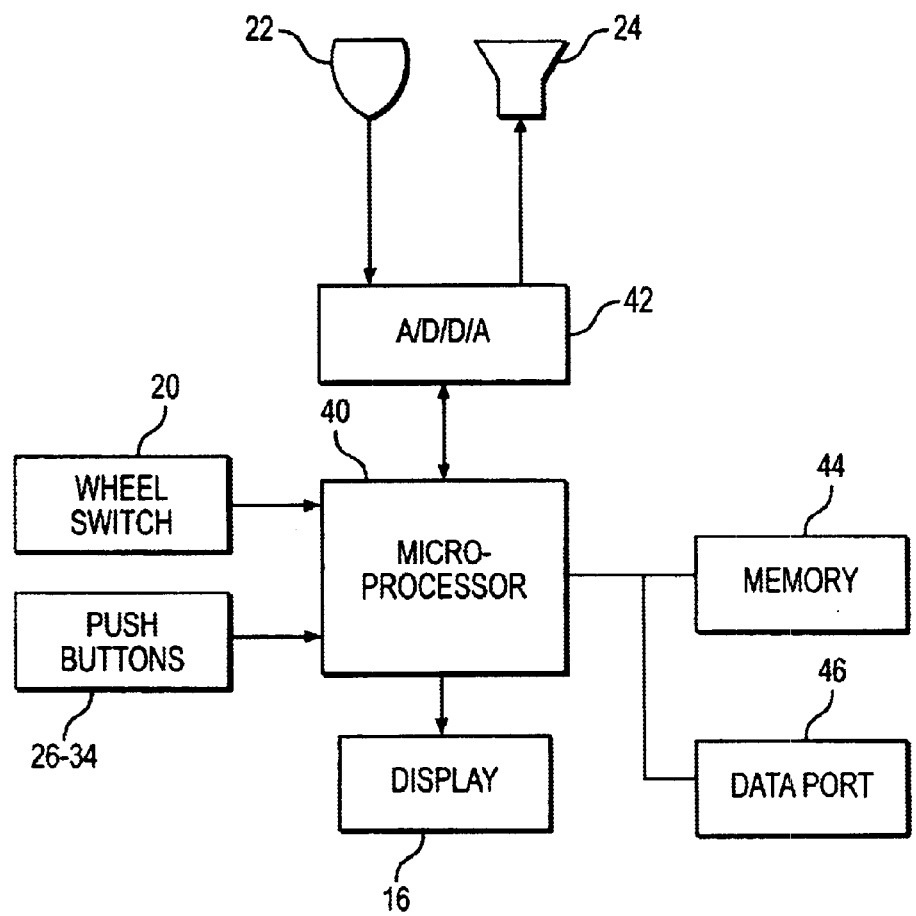
FIG. 2 is a simplified block-diagram representation of components of the palm top computer of FIG. 1.

FIG. 2 is a schematic block diagram of electronic and related components mounted in the housing 12 of the palm top computing device 10. Respective blocks in FIG. 2 represent the following previously-mentioned components of the computing device 10—screen display 16, rocker switch 20, microphone 22, speaker 24, and push buttons 26–34. Each of these components is in communication, directly or indirectly, with a microprocessor 40 that functions as the CPU of the computing device 10.

Microphone 22 and speaker 24 are connected to the microprocessor 40 via a record/playback circuit 42. The record/playback circuit 42 includes analog-to-digital and digital-to-analog conversion functions, in addition to other conventional functions carried out in connection with digitally recording and reproducing sound signals.

Also in communication with the microprocessor 40 are memory components 44 and a data port 46. As will be appreciated, the memory components 44 serve such functions as program storage, working memory space, and mass storage. The memory components 44 may be constituted, in accordance with conventional practice, as one or more of flash memory, battery-backed-up RAM or any other suitable memory device or combination of devices including an optional removable memory card. The data port 46, although not visible in FIG. 1, is preferably mounted on a bottom face of the housing 12 and permits the computing device 10 to be placed in data communication with external devices such as lap top or desk top PC's.

The present invention is concerned with a novel adaptation of the rocker switch 20 to provide sound recording and playback control functions such as are commonly available in portable dictation devices. Although it is known to use palm top computing devices for recording voice notes or the like, it has not heretofore been recognized that a palm top computing device can be programmed so as to provide a highly effective and ergonomically sophisticated dictation user interface via a rocker switch like the rocker switch 20.

Figure 3A:
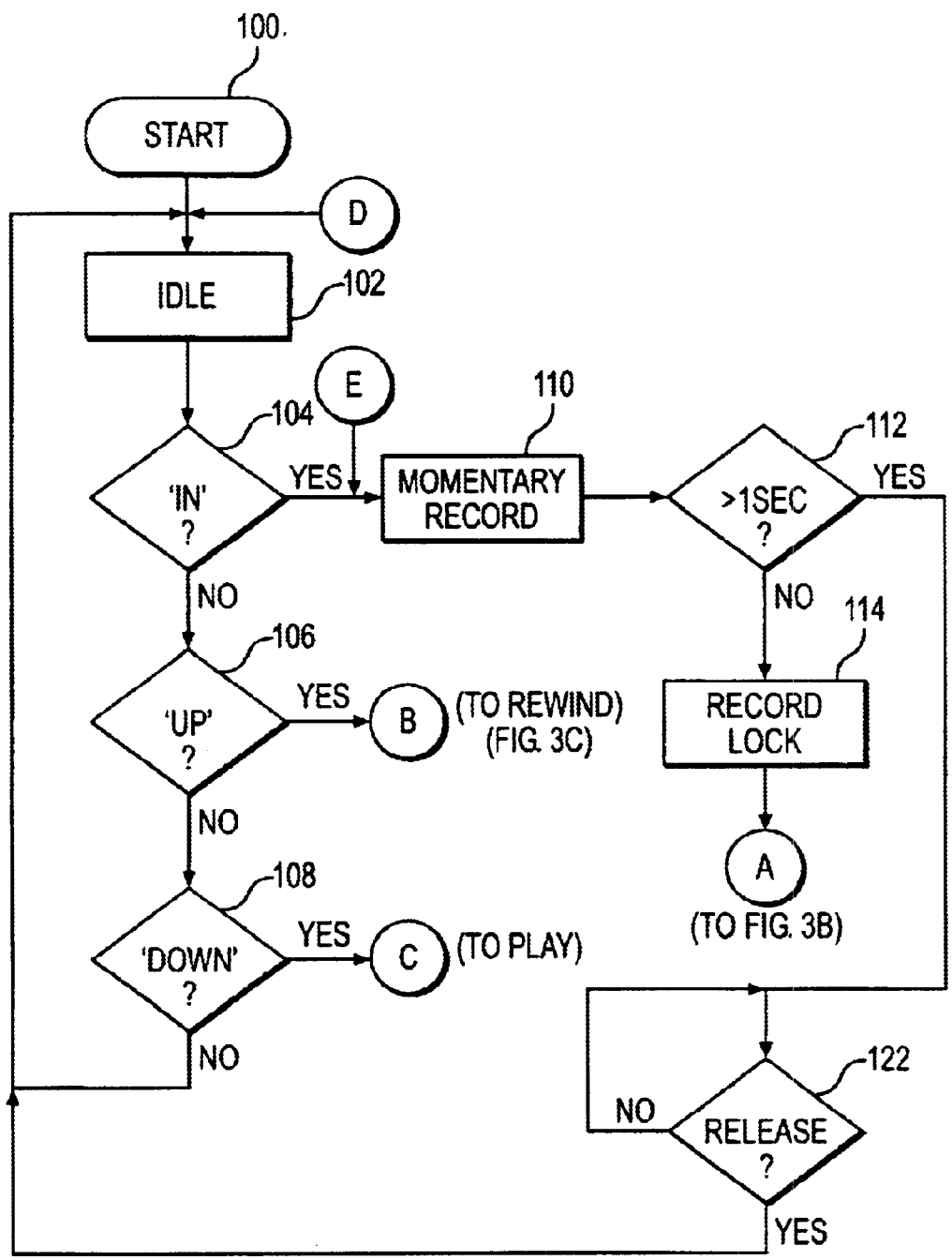
FIGS. 3A–3C together form a flowchart which illustrates software that programs the palm top computer of FIGS. 1 and 2 in accordance with the invention.
Figure 3B:
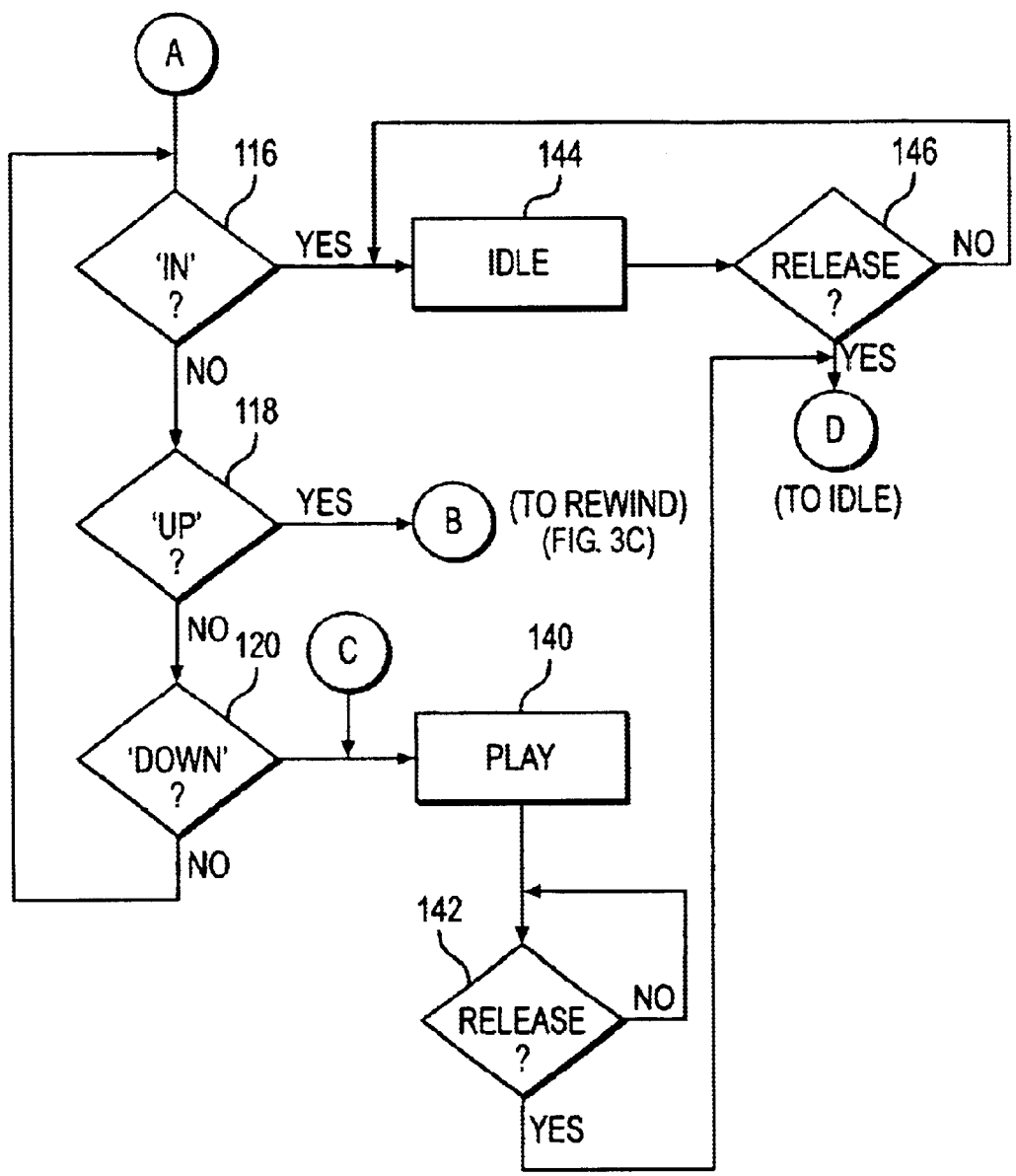
Figure 3C:
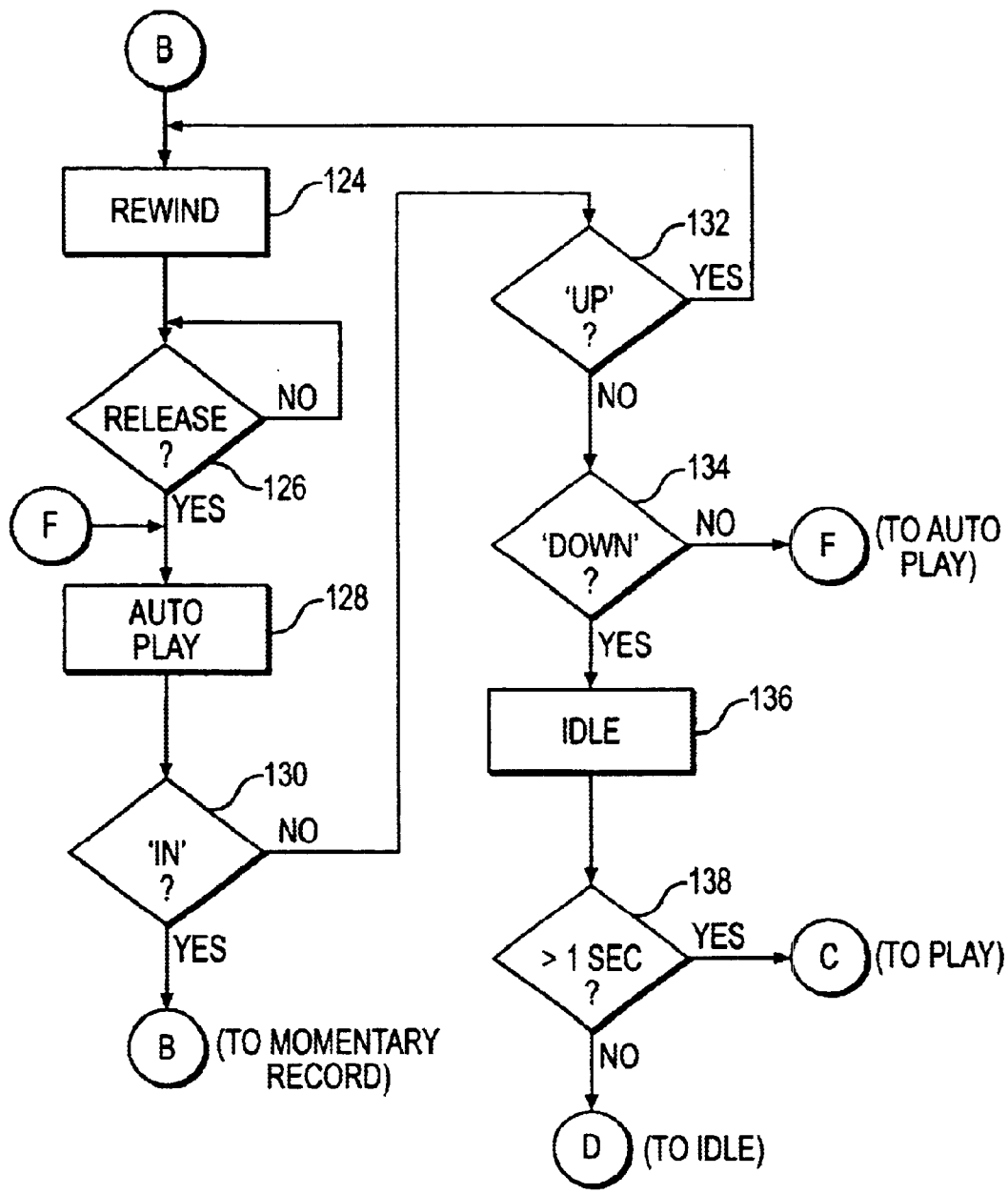

It is contemplated that the palm top computing device 10 may be operable in a plurality of modes, including a file and/or function navigation mode and a dictation mode. The dictation mode may be entered by suitable actuation of one of the push buttons 26–34 and/or by operating the rocker switch 20, possibly in conjunction with icons or function-selection entries displayed on the screen 16. FIGS. 3A–3C together form a flowchart which illustrates program functions that are invoked upon entry into the dictation mode. In general, as will be seen from the following detailed description of the program functions of FIGS. 3A–3C, the "in" position of the rocker switch 20 is used to actuate a record function, the "up" position of the rocker switch 20 is used to actuate a rewind function, and the "down" position of the rocker switch 20 is used to actuate a play function. It is to be understood that the nature of the rocker switch 20 makes it possible, with the programming provided in accordance with the invention, to control the main dictation functions using only a single finger or just the user's thumb. It should also be understood that the assignments of rocker switch positions to dictation functions may be varied from the mapping described above.

Turning then to the program functions illustrated in FIG. 3A, block 100 is indicative of entry into the dictation mode. Immediately upon entry into the dictation mode, an idle condition is entered, as indicated by block 102. It is then determined, as indicated in decision blocks 104, 106 and 108, whether the rocker switch 20 is moved to any one of its three actuated positions, namely "in", "up", and "down". If the rocker switch 20 is moved to its "in" position, then the computing device is placed in a "momentary record" condition, as indicated at block 110, and sounds such as the user's voice entered through the microphone 22 are recorded in the memory 44 of the computing device. Then, as indicated at decision block 112, it is determined whether the rocker switch is maintained in its "in" position for more than a pre-determined brief time such as one second. If this is not the case, i.e. if the actuation of the rocker switch's "in" position is quite brief, then a "record lock" state is entered, as indicated at block 114. In the record lock mode, recording continues until the rocker switch is again moved to one of its actuated positions, as indicated at decision blocks 116, 118 and 120 in FIG. 3B. But if the actuation of the rocker switch to its "in" position is found to last more than the pre-determined time, then momentary record operation continues until the "in" position of the rocker switch is released, as indicated at decision block 122. Upon release of the rocker switch from its "in" position, recording ceases and the program returns to the idle state of block 102.

If, during the idle state, the rocker switch is moved to its "up" position as determined at block 106, then a rewind operation commences, as indicated by block 124 in FIG. 3C. Decision block 126 indicates that the rewind operation continues until the rocker switch is released from its "up" position. Upon release of the "up" position, sound reproduction (playback) automatically begins (block 128) at the point in the accessed voice file to which the rewinding operation moved the relevant pointer. Playback continues until the rocker switch is moved to one of its three actuated positions, as indicated by decision blocks 130, 132 and 134. If the rocker switch is moved to the "in" position, as indicated at block 130, then the momentary record block 110 of FIG. 3A is entered. If the rocker switch is moved to the "up" position as indicated at block 132, the program returns to the rewind state of block 124. If the rocker switch is moved to the "down" position as indicated by block 134, an idle state is entered, as indicated by block 136. It is then determined, at decision block 138, whether the period of actuation of the rocker switch in the "down" position is greater than a predetermined brief period such as one second. If not, the idle state of block 102 is entered. But if the period of actuation in the "down" position exceeds one second, then playback begins, as indicated by block 140 (FIG. 3B).

Reference to blocks 108 and 120 respectively (FIGS. 3A and 3B) indicates that the playback condition of block 140 may also be entered from the idle state of block 102 or from the record lock state of block 114. Playback continues, as indicated by decision block 142, until the rocker switch is released from its "down" position. When release occurs, the program returns to the idle state of block 102.

Considering once more decision blocks 116 and 118, it will be understood that actuating the rocker switch in the "in" position during the record lock state of block 114 causes entry into idle states, as indicated by blocks 144 and 146 (FIG. 3B) and block 102 of FIG. 3A. Actuation of the rocker switch in the "up" position during the record lock state causes rewinding (block 124) to occur. Access to the play function of block 140 via the "down" position from the record lock state has previously been mentioned.

One notable feature of the dictation mode program illustrated in FIGS. 3A–3C is that two distinct recording modes, namely momentary record and record lock, are both actuated via the "in" position of the rocker switch, depending on the duration of actuation of the switch in the "in" position. However, this feature is not essential to the invention and may be omitted. Indeed, many variations in the program illustrated in FIGS. 3A–3C are contemplated. For example, it is contemplated to actuate additional functions such as fast forward or cueing by actuating respective ones of the push buttons 26–34 when the computing device 10 is in the dictation mode. Other functions that may be actuated by operation of a push button are "close file" and "append text note" functions.

According to another possible variation in the dictation programming, "double tapping" the rocker switch into the "down" position could cause the computing device to jump to the end of the current voice file.

As another contemplated variation, the computing device may be programmed to enter a "rewind latch" state wherein a momentary actuation of the rocker switch in the "up" position would cause a continuous rewind until there was further actuation of the rocker switch. As still another variation, "double tapping" the rocker switch into the "up" position could cause an immediate jump back to the beginning of the current voice file.

It is also contemplated to make variations in the above-described programming to account for possible VOX (voice operated recording) operations.

Other possible variations in the dictation programming will be apparent to those who are skilled in the art.

It is contemplated that exiting from the dictation mode may be accomplished by pressing one of the push buttons that has been designated as an "escape" key.

With the programming features of the present invention, a palm top computing device having conventional hardware for sound recording and playback and a conventional rocker switch for navigating among files may also operate as a high-quality, portable digital dictation recorder. The user interface provided for dictation is highly convenient and uses the file navigation rocker switch to provide functionality similar to the type of dictation interface provided on portable dictation recorders which incorporate a slide switch, or on known dictation stations of the type having a telephone-style handset and a thumb-operable yoke.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A palm top computing device, comprising:
   a processor;
   a display device driven by said processor;
   a memory device connected to said processor;
   a microphone for generating electrical signals representative of audible sounds received at said microphone;
   means for storing in said memory device digitized sound signals representative of said electrical signals generated by said microphone;
   means for audibly reproducing sound signals stored in said memory device; and
   a rocker switch for being manually operated by a user of said computing device to input instruction signals to said processor, said rocker switch selectively positionable in an "in" position, an "up" position and a "down" position;
   said computing device being operable in a first mode in which said rocker switch is employed by the user to navigate among entries displayed on said display device;
   said computing device being operable in a second mode in which a first one of said positions of said rocker switch actuates sound recording by said computing device, a second one of said positions of said rocker switch actuates a rewind function with respect to sound signals stored in said memory device, and a third one of said positions of said rocker switch actuates a play function with respect to sound signals stored in said memory device.

2. A palm top computing device according to claim 1, wherein said first one of said positions is said "in" position, said second one of said positions is said "up" position, and said third one of said positions is said "down" position.

3. A palm top computing device according to claim 2, wherein said computing device enters a record lock mode when the "in" position of the rocker switch is actuated for less than a predetermined period of time, and said computing device enters a momentary record mode when the "in" position of the rocker switch is actuated for more than said predetermined period of time.

4. A palm top computing device according to claim 1, wherein said means for storing includes an analog-to-digital converter and said means for audibly reproducing includes a digital-to-analog converter and a speaker.

5. A palm top computing device, comprising:
   a processor;
   a display device driven by said processor;
   a memory device connected to said processor;
   a microphone for generating electrical signals representative of audible sounds received at said microphone;
   means for storing in said memory device digitized sound signals representative of said electrical signals generated by said microphone;
   means for audibly reproducing sound signals stored in said memory device; and
   a rocker switch for being manually operated by a user of said computing device to input instruction signals to said processor, said rocker switch selectively positionable in an "in" position, an "up" position and a "down" position;
   said computing device being operable in a first mode in which said "up" and "down" positions of said rocker switch are employed by the user to scroll through entries displayed on said display device and said "in" position of said rocker switch is employed by the user to select an entry displayed on said display device;
   said computing device being operable in a second mode in which said "in" position of said rocker switch actuates sound recording by said computing device, said "up" position of said rocker switch actuates a rewind function with respect to sound signals stored in said memory device, and said "down" position of said rocker switch actuates a play function with respect to sound signals stored in said memory device.

6. A palm top computing device according to claim 5, wherein said computing device enters a record lock mode when the "in" position of the rocker switch is actuated for less than a predetermined period of time, and said computing device enters a momentary record mode when the "in" position of the rocker switch is actuated for more than said predetermined period of time.

7. A palm top computing device according to claim 5, wherein said means for storing includes an analog-to-digital converter and said means for audibly reproducing includes a digital-to-analog converter and a speaker.

8. A method of operating a palm top computing device, the computing device including a rocker switch for navigating among files stored in the computing device, the method including the step of using the rocker switch to control dictation functions in a sound recording mode of the computing device;

wherein said rocker switch is selectively positionable in an "in" position, an "up" position and a "down" position, said step of using the rocker switch to control dictation functions including:

actuating sound recording by said computing device by placing said rocker switch in a first one of said three positions;

actuating a rewind function by placing said rocker switch in a second one of said three positions; and actuating a playback function by placing said rocker switch in a third one of said three positions.

9. A method according to claim 8, wherein said first of said three positions is said "in" position, said second one of said three positions is said "up" position, and said third one of said three positions is said "down" position.

10. A method according to claim 9, wherein a record lock mode is entered by placing said rocker switch in said "in" position for less than a predetermined period of time, and a momentary record mode is entered by placing said rocker switch in said "in" position for more than said predetermined period of time.

\* \* \* \* \*